United States Patent [19]
Mahaney

[11] Patent Number: 5,121,953
[45] Date of Patent: Jun. 16, 1992

[54] LOCKING RING ASSEMBLY FOR UTILITY METERS

[75] Inventor: John C. Mahaney, Rutland, Mass.
[73] Assignee: Inner-Tite Corp., Holden, Mass.
[21] Appl. No.: 788,616
[22] Filed: Nov. 6, 1991
[51] Int. Cl.⁵ .............................................. B65D 55/14
[52] U.S. Cl. .................................................. 292/256.6
[58] Field of Search ............................ 292/327, 256.6; 24/20 R, 20 EE; 403/338

[56] References Cited

U.S. PATENT DOCUMENTS 4,611,478  9/1986  Carlson et al. ............... 292/256.6 X
4,702,093 10/1987  DeWalch ..................... 292/256.6 X
4,828,300  5/1989  Agboy ........................... 292/256.6

Primary Examiner—Richard E. Moore
Attorney, Agent, or Firm—Samuels, Gauthier & Stevens

[57] ABSTRACT

A locking ring assembly of the type employed to prevent unauthorized access to a meter, comprising a split ring retaining ring, to one end of which a housing is secured; the housing having a lock receiving opening and a side opening therein; a ring clip with a lock receiving opening is secured to a second end of the ring and enters the housing through the side opening. A cylindrical barrel lock is received in the housing through the lock receiving openings to maintain the ring on closed condition.

12 Claims, 3 Drawing Sheets

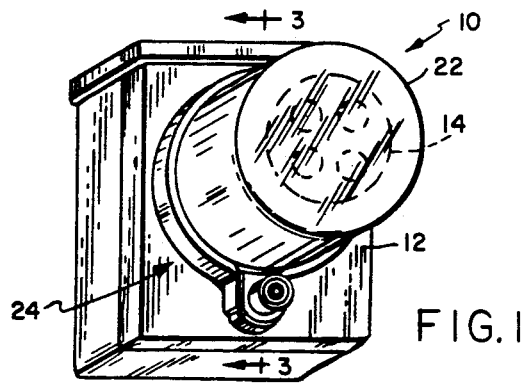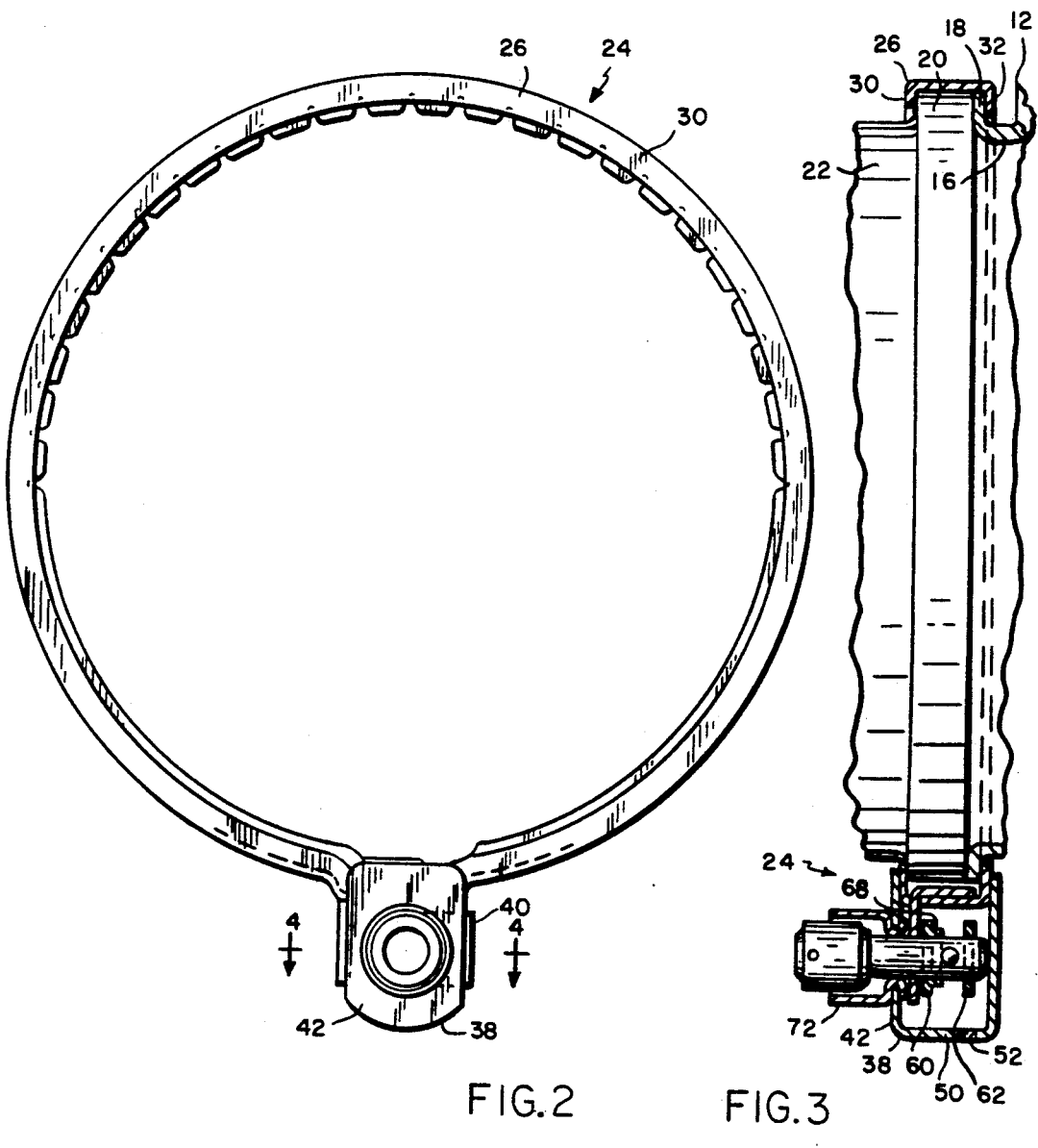

LOCKING RING ASSEMBLY FOR UTILITY METERS

BACKGROUND OF THE INVENTION

1. Field of the Invention

This invention relates generally to utility meters, and is concerned in particular with an improved locking assembly of the type employed to prevent unauthorized access to such meters.

2. Description of the Prior Art

The conventional utility meter includes a housing containing the meter mechanism. A circular front port in the housing affords access to the meter mechanism in addition to displaying the meter dials. The circular housing port is surrounded by a peripheral flange adapted to mate in face to face abutting relationship with a peripheral flange on a glass bowl covering the front housing port. In order to maintain the glass bowl in place and thereby prevent unauthorized access to the meter mechanism, locking ring assemblies are employed to radially and axially confine the mating housing and bowl flanges.

Earlier locking ring assemblies, as disclosed for example in U.S. Pat. No. 4,008,585 (Lundberg), comprised split rings having their ends held together by a screw, with access to the screw being blocked by a separate lock housing designed to receive a side entry barrel lock. Although such assemblies offered reasonable security, the separate screws and lock housings proved difficult and awkward to assemble.

A later design, as disclosed in U.S. Pat. No. 4,611,478 (Carlson et al) eliminated the separate connecting screw and included the lock housing as an integral part of the ring. The ring was subdivided into mating semi-circular halves connected together by a hinge, and the lock housing was redesigned to accommodate front entry of the barrel lock. This arrangement was markedly easier to assemble, but the hinge connection between the ring halves offered less than adequate resistance to tampering by unauthorized personnel.

U.S. Pat. No. 4,828,300 (Agbay) discloses a further improvement, which retains the advantageous features of the Carlson et al design while eliminating the connecting hinge in favor of a redesigned rear flange having a special tapered configuration allowing the ends of the ring to be more easily spread during mounting and removal.

The foregoing prior art ring assemblies have conventionally been fabricated from cadmium plated heat treated low carbon steel. This material is relatively inexpensive, and thus raw material waste during manufacture has never been a major concern. A drawback with this material, however, is that it has a relatively low level of resistance to corrosion, which is a problem of increasing concern to utility companies, particularly where large numbers of customers are located along coastal or in industrial areas having corrosive environments.

SUMMARY OF THE INVENTION

The locking ring of the present invention comprises an integral assembly of components fabricated from stainless steel. Although this material is more expensive and more difficult to fabricate as compared to conventional cadmium plated low carbon steels, these disadvantages are more than offset by a high level of resistance to corrosion. Care has been taken to design the ring components for fabrication with minimum resulting waste of raw material. The ring components are assembled in a tamper proof interlocked relationship which relies on press fitting, bending and swaging. Welding is avoided, thereby safeguarding the corrosive resistance of the stainless steel components. The resulting assembly is thus highly resistant to tampering by unauthorized personnel, in addition to being highly resistant to corrosion.

These and other objects and advantages of the present invention will be described hereinafter in greater detail with reference to the accompanying drawings, wherein:

BRIEF DESCRIPTION OF THE DRAWINGS

FIG. 1 is a perspective view of a utility meter incorporating a locking assembly in accordance with the present invention;

FIG. 2 is a front elevational view of the locking assembly depicted in FIG. 1;

FIG. 3 is a sectional view on an enlarged scale taken along line 3—3 of FIG. 1;

DETAILED DESCRIPTION OF PREFERRED EMBODIMENT

Figure 4:
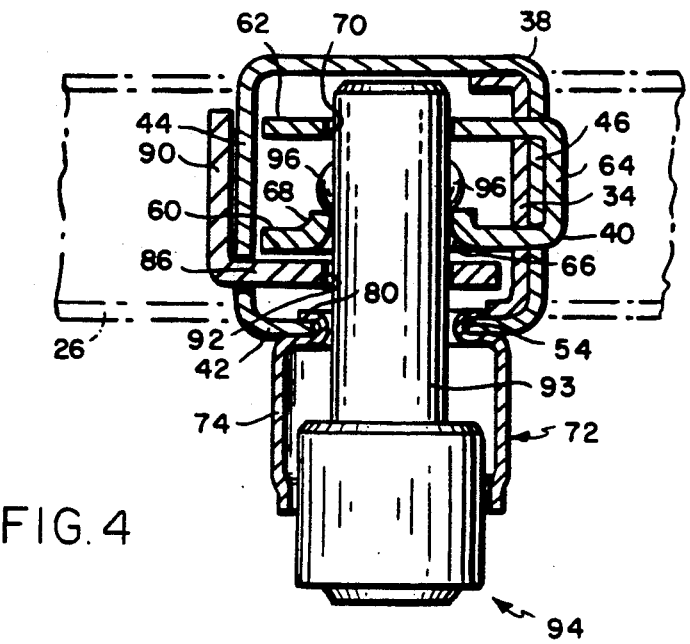
FIG. 4 is a sectional view taken along line 4—4 of FIG. 2.
Figure 5:
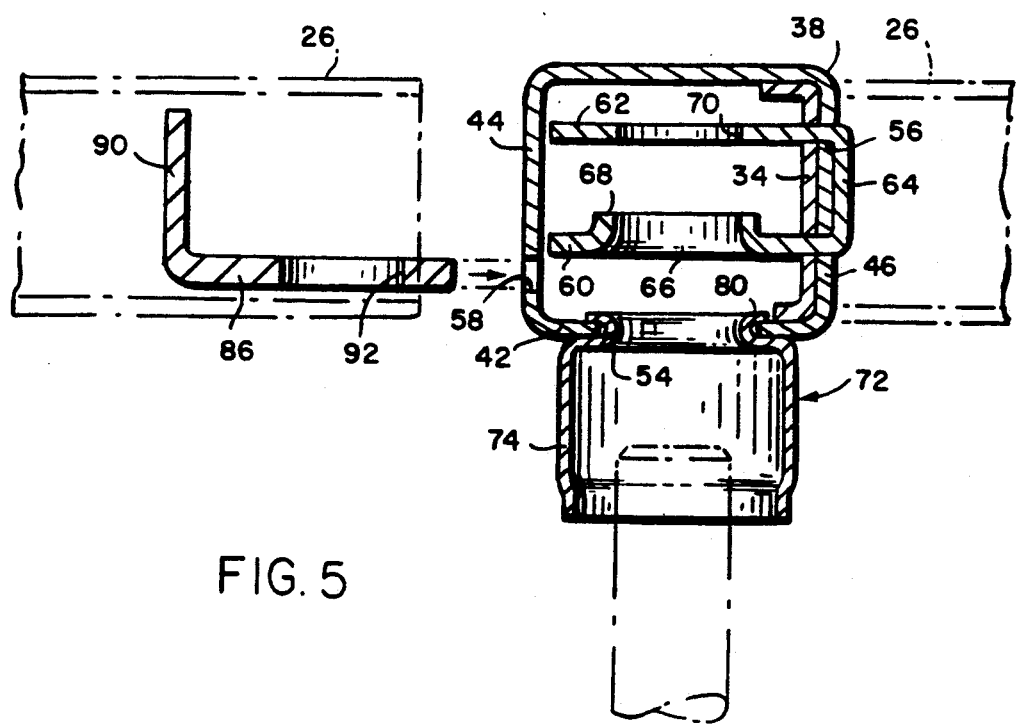
FIG. 5 is a view similar to FIG. 4, but showing the split retaining ring in the open condition with the barrel lock axially withdrawn from lock housing.
Figure 6:
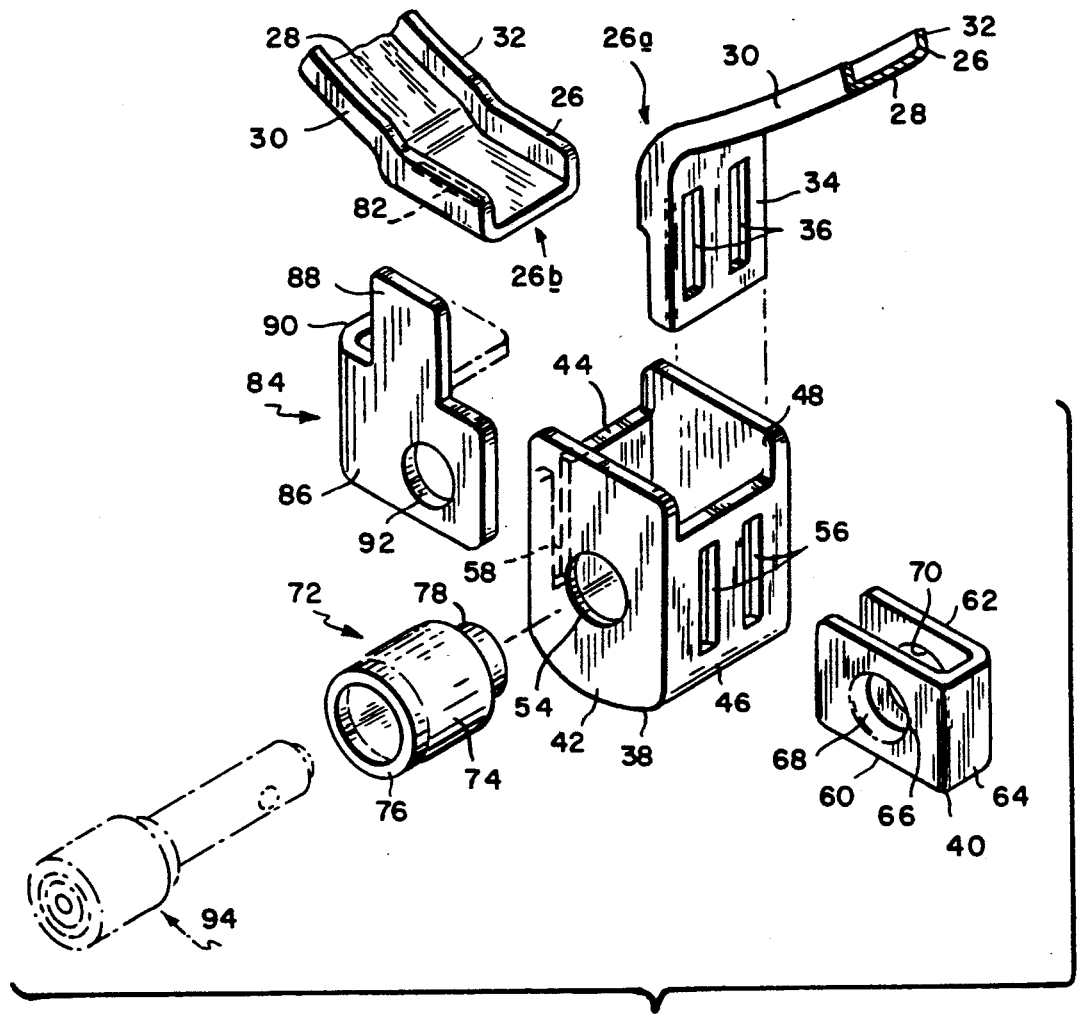
FIG. 6 is an exploded perspective view of the components making up the locking assembly.

Referring initially to FIGS. 1 and 3, a conventional utility meter is shown at 10 compriss, it will be seen that the locking ring assembly 24 includes a split retaining ring 26 having first and second ends 26a, 26b and a circular side wall 28 with front and rear flanges 30, 32 protruding radially inwardly therefrom. The ring is fabricated as a stainless steel stamping and is resiliently adjustable between an open condition at which its ends 26a, 26b are spread apart, as shown in FIG. 5, and a closed condition as shown for example in FIGS. 2 and 4.

A leg 34 is formed integrally with and extends outwardly from the first ring end 26a. The leg 34 includes parallel slots 36. A lock housing 38 is secured to the ring end 26a by means of a housing clip 40. The housing 38 has a front wall 42, first and second side walls 44, 46, a rear wall 48 and a bottom 50 with a drain hole 52 therein. A first lock receiving opening 54 is located in the front wall, the side wall 46 has parallel slots 56, and the opposite side wall 44 has a single slot 58.

The housing clip 40 is generally U-shaped with a pair of legs or flanges 60, 62 joined at a web 64. Flange 60 has a lock receiving opening 66 bordered by a swaged collar 68. Flange 62 also has a lock receiving opening 70 aligned with opening 66.

A tubular head protector 72 has an enlarged diameter barrel 74 with reduced diameter front and rear ends 76, 78. The rear end 78 is dimensioned to enter the lock receiving opening 54 in the housing front wall 42, and is adapted to be swaged as at 80 to secure the head protector 72 to the housing 38.

The housing 38 is assembled onto the ring end 26a, with the leg 34 extending inwardly behind the side wall 46. The slots 36 in the leg 34 are aligned with the slots 56 in the side wall 46 to receive the flanges 60, 62 of the housing clip 40 as the latter is inserted laterally into the housing 38. The top and bottom edges of the flanges 60, 62 are dimensioned and shaped to be press fitted into the slots 36. When thus inserted, only the web portion 64 of the housing clip is exposed, and the lock receiving openings 66, 70 are aligned axially with the lock receiving opening 54 and the tubular head protection 72 protruding therefrom.

The opposite end 26b of the ring 24 is slotted as at 82 to coact with a ring clip 84. The ring clip has a front wall 86 with an integral upstanding leg 88 and a rearwardly extending wall 90. The front wall 86 has a lock receiving opening 92, and the leg 88 is adapted to protrude through the ring slot 82, after which the leg 88 is bent under the ring side wall 28 to extend laterally between the front and rear ring flanges 30, 32. With the leg 88 thus bent under the ring side wall 28, the ring clip 84 is securely attached to the ring end wall 26b.

During installation of the locking ring assembly, the ends 26a, 26b of the ring 26 are resiliently spread apart to accommodate positioning of the mating housing and bowl flanges 18, 20 within the ring side wall 28 and between the front and rear ring flanges 30, 32. Thereafter, the ring ends 26a, 26b are brought together, causing the front wall 86 of the ring clip 84 to enter the lock housing 28 through the slot 58 in the housing side wall 44, and resulting in the lock receiving opening 92 being aligned with openings 66, 70 in the housing clip flanges 60, 62 and with the opening 54 in front housing wall 42.

The stem 93 of a conventional barrel lock 94 is then inserted through the head protector 72 into the lock housing 3 where it extends axially through the aligned lock receiving openings 54, 92, 66, 70, thereby establishing and interlocked relationship between the front wall of 42 of the lock housing 38, the front wall 86 of the ring clip 84, and the legs 60, 62 of the housing clip 40. A conventional key (not shown) is then employed to install the lock. Removal of the key allows internal spring loaded lock components to expand the locking balls 96 on the lock stem 93.

The ends of the ring are thus securely locked in a closed condition with the flanges 18, 20 on the meter housing 12 and glass bowl 22 securely captured within the ring side wall 28 between the front and rear ring flanges 30, 32.

The head of the barrel lock 94 is protected by the barrel 74 of the head protector 72, and the locking balls 96 are located behind the swaged collar 68 surrounding the lock receiving opening 66. Should an attempt be made at forcibly withdrawing the barrel lock, the swaged collar 68 will engage the locking balls 96 with markedly increased resistance.

Attempts at foiling the lock by severing exposed flanges or webs will come to no avail. For example, even if the web 64 of housing clip 40 is severed, the housing will remain locked in place because of the interlocked relationship of the legs 60, 62 with the lock stem and with the integral ring leg 34.

Severing or damaging side wall 90 on ring clip 84 will be equally ineffective. The ring clip will remain connected to the ring end 26b by means of its leg 88 bent under the ring side wall 28, and the front wall 86 of the ring clip will remain within the housing 38 in an interlocked with the stem 93 of the barrel lock.

All components are stamped or deep drawn from stainless steel stock, and their interconnection is achieved by bending, swaging and press fitting. Welding is completely avoided.

I claim:

1. A locking ring assembly for detachably interconnecting a pair of circular rims in an axially aligned abutting relationship, said assembly comprising:

a split retaining ring having first and second ends and a circular side wall with front and rear flanges protruding radially inwardly therefrom, said ring being resiliently adjustable between an open condition accommodating installation and removal of said ring onto and off of said rims, and a closed condition confining said rims within said side wall and between said front and rear flanges;

a housing secured to and extending outwardly from the first end of said ring, said housing having a front wall with a first lock receiving opening therein and at least one side wall with a side opening therein;

a ring clip secured to and extending outwardly from the second end of said ring, said ring clip having a front wall with a second lock receiving opening therein, the front wall of said ring clip being arranged to enter said housing through said side opening and to locate said second lock receiving opening in alignment with said first lock receiving opening when said ring is adjusted to said closed condition; and a cylindrical barrel lock receivable in said housing through said aligned lock receiving openings to establish an interlock between said housing and said ring clip, thereby maintaining said ring in said closed condition.

2. The locking ring assembly of claim 1 wherein said ring is provided with an integrally formed leg extending outwardly therefrom at said first end, said housing being secured to said leg.

3. The locking ring assembly of claim 2 wherein said housing is additionally provided with a second side wall disposed oppositely to said one side wall, said leg extending into said housing adjacent to the interior of said second side wall.

4. The locking ring assembly of claim 3 wherein said housing is secured to the first end of said ring by means of a housing clip extending through aligned openings in said second side wall and said leg.

5. The locking ring assembly of claim 4 wherein said housing clip includes at least one flange extending across the interior of said housing, said flange having a third lock receiving opening in alignment with said first and second lock receiving openings to receive a barrel lock inserted in said housing.

6. The locking ring assembly of claim 1 wherein said wall is provided with an opening at the second end of said ring, said ring clip having a leg which protrudes through said opening and which is bent under said wall to extend laterally between said front and rear flanges.

7. The locking ring assembly of claim 6 wherein said ring clip further comprises a side wall extending perpendicularly and rearwardly from said front wall.

8. The locking ring assembly of claim 1 further comprising a tubular sleeve protruding externally from said housing at said first lock receiving opening.

9. The locking ring assembly of claim 8 wherein said tubular sleeve extends into said first lock receiving opening, said sleeve having an external shoulder abutting the exterior face of the front wall of said housing and having an interior swaged collar engaging the interior face of the front wall of said housing.

10. The locking ring assembly of claim 5 wherein said third lock receiving opening is surrounded by a swaged collar.

11. The locking ring assembly of according to any one of claims 1-10 wherein except for said barrel lock, all components of the lock assembly comprise metallic stampings.

12. The locking ring assembly of claim 11 wherein said components are stamped from stainless steel flat stock.

* * * * *